US008296848B1

(12) United States Patent
Griffin et al.

(10) Patent No.: US 8,296,848 B1
(45) Date of Patent: Oct. 23, 2012

(54) CONTROL FLOW REDIRECTION AND ANALYSIS FOR DETECTING VULNERABILITY EXPLOITATION

(75) Inventors: Kent E. Griffin, Santa Monica, CA (US); Carey S. Nachenberg, Northridge, CA (US); Shane A. Pereira, Newbury Park, CA (US)

(73) Assignee: Symantec Corporation, Mountain View, CA (US)

( * ) Notice: Subject to any disclaimer, the term of this patent is extended or adjusted under 35 U.S.C. 154(b) by 1207 days.

(21) Appl. No.: 11/766,048

(22) Filed: Jun. 20, 2007

(51) Int. Cl.
*G06F 11/00* (2006.01)
*G06F 12/14* (2006.01)

(52) U.S. Cl. ............ 726/23; 726/22; 726/25; 726/30; 715/201; 715/205; 715/232; 717/124; 717/128

(58) Field of Classification Search ............. 726/22, 726/23, 25, 30; 715/201, 205
See application file for complete search history.

(56) References Cited

U.S. PATENT DOCUMENTS

| | | | | |
|---|---|---|---|---|
| 5,220,567 | A * | 6/1993 | Dooley et al. | 714/704 |
| 7,681,235 | B2 * | 3/2010 | Chesla et al. | 726/23 |
| 7,735,135 | B1 * | 6/2010 | Zhou | 726/22 |
| 7,739,740 | B1 * | 6/2010 | Nachenberg et al. | 726/25 |
| 7,802,299 | B2 * | 9/2010 | Geffner et al. | 726/22 |
| 7,962,961 | B1 * | 6/2011 | Griffin et al. | 726/25 |
| 2004/0039926 | A1 * | 2/2004 | Lambert | 713/189 |
| 2004/0064732 | A1 * | 4/2004 | Hall | 713/201 |
| 2004/0250107 | A1 * | 12/2004 | Guo | 713/200 |
| 2004/0255165 | A1 * | 12/2004 | Szor | 713/201 |
| 2005/0268112 | A1 * | 12/2005 | Wang et al. | 713/188 |
| 2006/0069692 | A1 * | 3/2006 | Pernia | 707/100 |
| 2006/0075478 | A1 * | 4/2006 | Hyndman et al. | 726/11 |
| 2006/0136720 | A1 * | 6/2006 | Armstrong et al. | 713/164 |
| 2006/0184651 | A1 * | 8/2006 | Tirnumala | 709/220 |
| 2006/0206866 | A1 * | 9/2006 | Eldrige et al. | 717/122 |
| 2006/0294592 | A1 * | 12/2006 | Polyakov et al. | 726/24 |
| 2007/0055711 | A1 * | 3/2007 | Polyakov et al. | 707/203 |
| 2007/0106986 | A1 * | 5/2007 | Worley, Jr. | 718/1 |
| 2007/0162975 | A1 * | 7/2007 | Overton et al. | 726/24 |
| 2008/0134321 | A1 * | 6/2008 | Rajagopal et al. | 726/21 |
| 2009/0271867 | A1 * | 10/2009 | Zhang | 726/24 |

OTHER PUBLICATIONS

Zhou J, Detecting attacks that exploit application—logic errors through application level auditing, Dec. 2004, IEEE, Date of conference—Dec. 6-10, 2004, 170-176.*

(Continued)

*Primary Examiner* — Nathan Flynn
*Assistant Examiner* — Viral Lakhia
(74) *Attorney, Agent, or Firm* — Fenwick & West LLP (57) ABSTRACT

A security module detects attempted exploitations of vulnerabilities of applications executing on a computer. The security module hooks an application on the computer. The hook transfers control flow to the security module if execution reaches a hooked location. When a hook is followed, the security module saves the state of the computer and activates an analysis environment. A virtual machine within the analysis environment executes signatures that programmatically analyze the state of the computer to determine whether a vulnerability in the application is being exploited. If a signature detects an exploit, the security module blocks the exploit by skipping over the one or more instructions that constitute the exploit, terminating the application, or performing a different action. The security module reports the detected exploit attempt to the user of the client. The security module returns control flow back to the application if it does not detect an exploit.

18 Claims, 4 Drawing Sheets

OTHER PUBLICATIONS

"Core Security | Penetration Testing—Open Source Projects," Core Security Technologies, 2007, [online] [Retrieved on Feb. 21, 2008] Retrieved from the Internet<URL:http://www.coresecurity.com/?module-ContentMod&action=item&id=1454>.

"Finjan SurfinGate Active Content Filter Bypass Vulnerability," SecurityFocus, 2007, [online] [Retrieved on Feb. 21, 2008] Retrieved from the Internet<URL:http://www.securityfocus.com/bid/6701/discuss>.

Reis, C. et al., "BrowserShield: Vulnerability-Driven Filtering of Dynamic HTML," Sep. 2007, 14 pages.

"Runtime Unmanaged Code Analysis for Software and Security Testing (Part 1)," Aug. 8, 2006, [online] [Retrieved on Feb. 21, 2008] Retrieved from the Internet<URL:http://talhatariq.wordpress.com/2006/08/08/runtime-unmanaged-code-analysis-for-softwar...>.

Sotirov, A., "Hotpatching and the Rise of Third-Party Patches," Black Hat USA 2006, [online] [Retrieved on Feb. 21, 2008] Retrieved from the Internet<URL:http://www.determina.com/security.research/presentations/bh-usa06/bh-usa06-sotirov.pdf>.

"Uninformed—SharedUserData SystemCall Hook," Uninformed.org, Jan. 2006, vol. 3, Article 4, [online] [Retrieved on Feb. 21, 2008] Retrieved from the Internet<URL:http://uninformed.org/index.cgi?v=3&a=4&p=22>.

"Uninformed—System Call MSR/IDT Hooking," Uninformed.org, Jan. 2006, vol. 3, Article 4, [online] [Retrieved on Feb. 21, 2008] Retrieved from the Internet<URL:http://uninformed.org/index.cgi?v=3&a=4&p=14>.

"Using Application Verifier Within Your Software Development Lifecycle," Microsoft Corporation, 2008, [online] [Retrieved on Feb. 21, 2008] Retrieved from the Internet<URL:http://msdn2.microsoft.com/en-us/library/aa480483(printer).aspx>.

"What is Norton Antivirus Script Blocking Technology?" Symantec Corporation, 1995-2008, [online] [Retrieved on Feb. 21, 2008] Retrieved from the Internet<URL:http://service1.symantec.com/SUPPORT/sunset-c2002kb.nsf/0/d3e29f9037e6a15c85256ed...>.

\* cited by examiner

CONTROL FLOW REDIRECTION AND ANALYSIS FOR DETECTING VULNERABILITY EXPLOITATION

BACKGROUND OF THE INVENTION

1. Field of the Invention

This invention pertains in general to computer security and in particular to detecting attempted exploits of vulnerabilities of applications and other programs executing on a computer.

2. Description of the Related Art

Applications executed on modern computers are often susceptible to a wide variety of network-based attacks. Web browsers, for example, are particularly susceptible to attacks because browsers receive large amounts of content from the Internet. The content can include hypertext markup language (HTML) web pages, scripts in languages such as VBScript and JavaScript, and executable content. Other types of applications are also vulnerable. For example, email programs and even word processors provide interfaces for executing network-based content.

Malicious attackers can compromise such applications by crafting specially-formulated input that exploits vulnerabilities in the programs. This input contains code that, when executed, gives the attackers control over the applications and allows them to perform malicious acts such as capturing keystrokes, sending messages on the network, deleting files, installing malicious software (malware) such as spyware and adware, etc.

One technique for detecting and preventing these malicious exploits is scanning network traffic entering the computer in order to detect malicious code. For example, an intrusion detection system (IDS) can scan network traffic entering an enterprise network for characteristics of malicious code, and then prevent the code from entering the enterprise. A problem with this approach is that attackers can use classical obfuscation and encryption techniques to evade detection. For example, an attacker can create a seemingly-innocent script that passes through the IDS but produces a malicious script when executed by an application.

The classical response to detecting obfuscated malicious code is to emulate the seemingly-innocent code to determine whether it produces malicious code. However, emulation is difficult to perform in this context. Oftentimes, there are many scripts and other types of code simultaneously passing through the IDS, or even entering a single computer, and the resources required to emulate all of the code are not available. Moreover, the code can incorporate techniques to defeat emulation, such as using lengthy delays before producing the malicious code or detecting the emulator and altering the malicious behavior.

BRIEF SUMMARY

The above and other needs are met by a computer, computer program product, and method for detecting an attempted exploit of a vulnerability of an application executed by the computer. Embodiments of the computer and computer program product comprise a hooking module that inserts a hook into the application and a redirection module that saves the state of the computer responsive to execution of the hook. The embodiments also comprise an analysis module that analyzes the state of the computer to determine whether malicious code is attempting to exploit the vulnerability of the application and a reporting module that reports whether malicious code is attempting to exploit the vulnerability.

Embodiments of the method comprise inserting a hook into the application and saving the state of the computer responsive to execution of the hook. The method further comprises analyzing the state of the computer to determine whether malicious code is attempting to exploit the vulnerability of the application and reporting whether malicious code is attempting to exploit the vulnerability.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
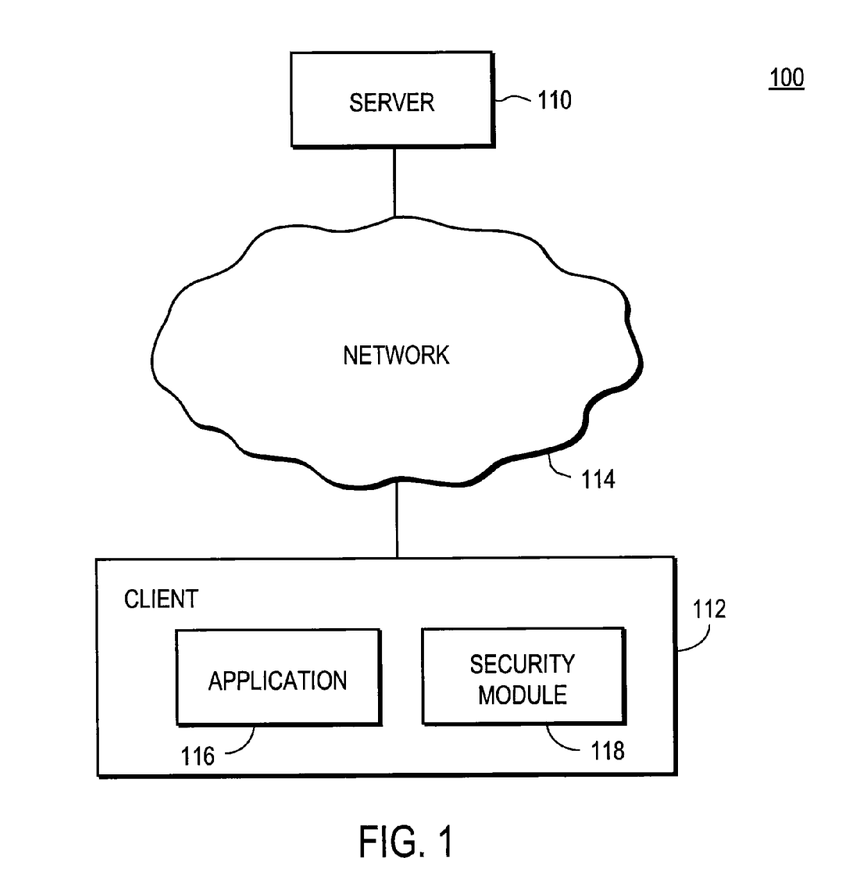
FIG. 1 is a high-level block diagram of a computing environment according to one embodiment.

FIG. 1 is a high-level block diagram of a computing environment 100 according to one embodiment. FIG. 1 illustrates a server 110 and a client 112 connected by a network 114. Only one server 110 and one client 112 are shown in FIG. 1 in order to simplify and clarify the description. Embodiments of the computing environment 100 can have thousands or millions of servers 110 and clients 112 connected to the network 114. In some embodiments, one or more of the clients are not connected to the network 114.

The server 110 provides content to the client 112 via the network 114. In one embodiment, the server 110 is a web server that provides content such as HTML web pages, scripts written in interpreted languages such as VBScript and JavaScript, executable programs, images, music, multimedia content, and the like. In other embodiments, the server 110 is a different type of server, such as a server dedicated to providing a specific type of content.

In some instances, the server 110 may surreptitiously provide malicious code to the client 112. For example, the server 110 may include a malicious script as part of a seemingly-innocuous web page. The script, when executed by the client 112, attempts to compromise the client by exploiting a vulnerability of a client application. One common vulnerability is a buffer overflow, where the malicious code can comprise the client 112 by storing data beyond the boundaries of a fixed-length buffer and thereby overwriting adjacent memory locations. Another common vulnerability is faulty logic error processing, where the malicious code performs an illogical operation that causes the computer to enter a state where it can be compromised. Once the client 112 is compromised, the code can perform other malicious actions.

In one embodiment, the client 112 is a computer used by one or more users to connect to servers 110, such as web servers, on the network 114. The client 112, for example, can be a personal computer or other network-capable device like a personal digital assistant (PDA), mobile telephone, pager, or television "set-top box." For purposes of this description, the term "client" also includes computers such as servers and gateways that have the characteristics described herein.

The client 112 executes one or more applications 116 such as a web browser, email program, word processor, spreadsheet, image viewer, or music player. The application 116 has an interface for executing content received from the server 110 via the network 114, stored on a local disk, or located elsewhere. In a common example, the application 116 is a web browser such as MICROSOFT INTERNET EXPLORER or MOZILLA FIREFOX that includes functionality for downloading web pages from the server 110 and executing scripts written in VBScript or JavaScript contained therein. As mentioned above, some content downloaded and/or accessed by an application 116 contains malicious code that attempts to exploit a vulnerability in the application and thereby compromise the client 112. For example, VBScript code can attempt to exploit a vulnerability in the web browser or other application executing the script. "Executing" as used herein also includes methods such as interpreting scripts and performing just-in-time (JIT) compiling of scripts into bytecode.

A security module 118 executing on the client 112 detects when malicious code such as a script is attempting to exploit a vulnerability of an application 116 and blocks the exploit. In one embodiment, the security module 118 hooks certain places in the instruction stream of the application 116 when the application's executable image is loaded into memory. The hook causes control to pass to the security module 118 when the hooked locations are executed by the application 116. The security module 118 analyzes the state of the client 112 to determine whether a vulnerability exploit is occurring. If an exploit is occurring, the security module 118 blocks the exploit by, for example, skipping the instructions that constitute the exploit or terminating the application. The security module 118 thus protects the client 112 by preventing malicious code received from the network 114 or elsewhere from exploiting vulnerabilities of applications on the client.

The network 114 represents the communication pathways between the server 110 and client 112. In one embodiment, the network 114 is the Internet. The network 114 can also utilize dedicated or private communications links that are not necessarily part of the Internet. In one embodiment, the network 114 uses standard communications technologies and/or protocols such as Ethernet, 802.11, etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
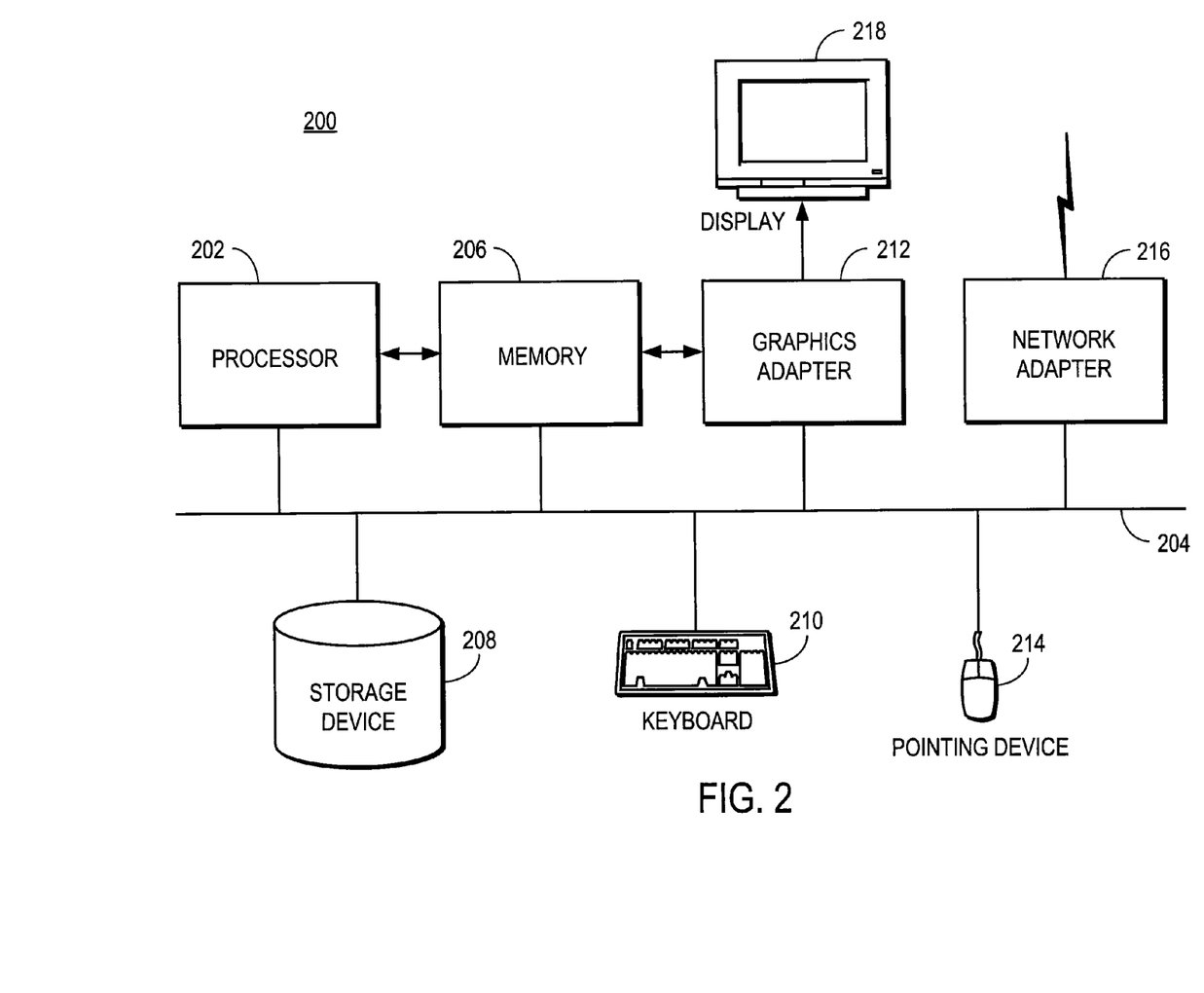
FIG. 2 is a high-level block diagram illustrating a typical computer for use as a server or client according to one embodiment.

FIG. 2 is a high-level block diagram illustrating a typical computer 200 for use as a server 110 or client 112 according to one embodiment. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

The types of computers 200 utilized by the entities of FIG. 1 can vary depending upon the embodiment and the processing power utilized by the entity. For example, a client 112 that is a mobile telephone typically has limited processing power, a small display 218, and might lack a pointing device 214. The server 110, in contrast, may comprise multiple blade servers working together.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

In addition, this description uses the term "application" to refer to a program executed by the computer 200. The application is formed of one or more files that typically reside on the storage device 208 and are loaded into memory 206 when executed. At least one of the files loaded into memory 206 is referred to as the "executable image" and is executed as a process. The computer 200 has a state that is defined by the content of the memory 208, values stored in registers of the processor 202, and/or other data within the computer at a given instant.

Figure 3:
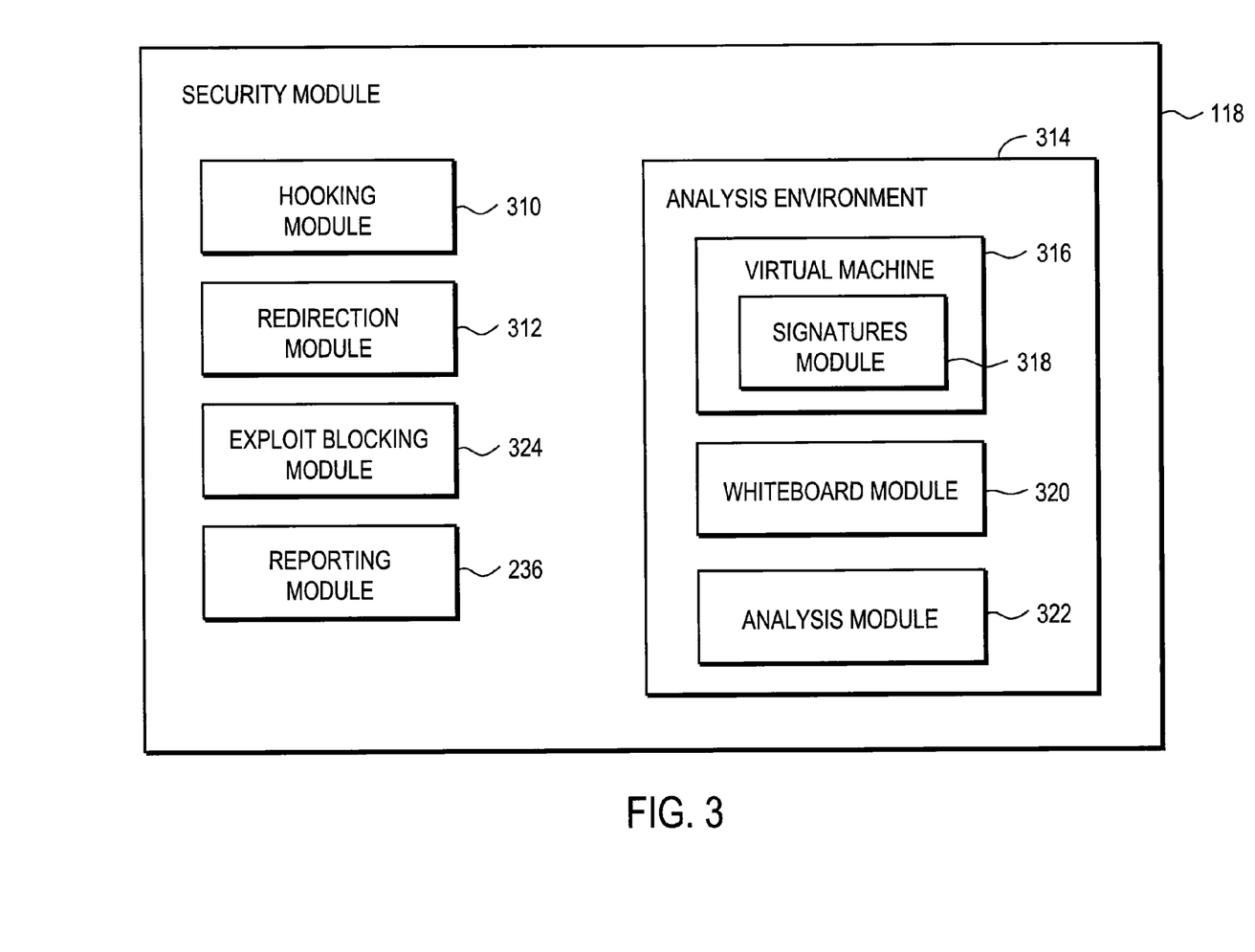
FIG. 3 is a high-level block diagram illustrating a detailed view of the security module of the client according to one embodiment.

FIG. 3 is a high-level block diagram illustrating a detailed view of the security module 118 of the client 112 according to one embodiment. In some embodiments the security module 118 is incorporated into an operating system executing on the client 112 while in other embodiments the security module is a standalone application or part of another product. As shown in FIG. 3, the security module 118 itself includes multiple modules. Those of skill in the art will recognize that other embodiments of the security module 118 can have different and/or other modules than the ones described here, and that the functionalities can be distributed among the modules in a different manner.

A hooking module 310 hooks instruction streams of certain applications 116 on the client 112 to transfer control flow to the security module 118 at certain points during the applications' executions. In one embodiment, the hooking module 310 identifies the applications on the client 112 that have vulnerabilities that can be exploited by malicious code in content received via the network 114 or from other sources. An embodiment of the hooking module 310 receives a list of applications and exploitable vulnerabilities from the developer of the security module 118 and/or from another source and compares the applications in the list with the applications installed on the client 112. For example, the hooking module 310 can use the list to recognize that the client 112 has the MICROSOFT INTERNET EXPLORER web browser installed and that this application has an interface for receiving and executing scripts received from servers 110 on the network 114. This list can be downloaded via the network 114.

The hooking module 310 determines the best place to hook an application 116 to detect an exploit of a given vulnerability. The "best place" is determined on a vulnerability-by-vulnerability basis since different hooks may be needed to detect different exploits. Regardless, there is a general desire to minimize the number of total hooks in the application and, therefore, the best places to hook in one embodiment are locations that allow detections of multiple vulnerability exploits. Thus, an embodiment of the hooking module 310 hooks the applications at locations corresponding to functions, methods or interfaces likely to be used by multiple types of exploits.

In one embodiment, the hooking module 310 hooks the interfaces provided by the scripting component of the application 116 that allow executing scripts to interact with the other components of the application. Virtually all malicious scripts must interact with components other than the scripting components in order to perform malicious actions. Therefore, the interfaces provided by the scripting components serve as a "funnel" or "chokepoint" where a single hook allows detection of multiple types of vulnerability exploits.

In embodiments where the client 112 executes a variation of the MICROSOFT WINDOWS® operating system, there are typically two scripting components provided by the web browser and/or other applications 116. One scripting component supports execution of scripts written in JavaScript, while the other scripting component supports execution of scripts written in VBScript. In addition, each scripting component provides two standard Component Object Model (COM) methods allowing scripts to interact with other components: IDispatch::Invoke and IDispatchEx::InvokeEx. An embodiment of the hooking module 310 hooks calls to both of these methods for each scripting component, for a total of at least four hooks in the application. Different embodiments of the hooking module 310 hook different and/or other locations, depending upon variations such as the operating system executing on the client 112, the applications on the client, and the vulnerabilities and exploits of the particular applications.

In one embodiment, the hooking module 310 installs a hook by replacing one or more instruction in the application's instruction stream with a jump instruction or other similar instructions that redirect control flow to the security module 118. Further, an embodiment of the hooking module 310 hooks the in-memory image of the executable process for the application at load time. Hooking at load time minimizes the possibility that the hooked code will execute during the hooking process and cause client instability.

A control flow redirection module 312 (the "redirection module") activates when hooked code in the application 116 is executed. An embodiment of the redirection module 312 saves the state of the client 112, including the parameters of the hooked call (if any), for subsequent analysis. The redirection module 312 transfers control flow into an analysis environment 314. In addition, an embodiment of the redirection module 312 restores the original state of the client 112 and transfers control flow back to the hooked application 116 upon completion of the analysis. The redirection module 312 transfers control flow back to the application 116 by executing the original instructions that were replaced when the hook was installed (unless those instructions constitute an exploit).

The analysis environment 314 provides a secure environment in which the state of the client 112 (including the state of the application 116) can be analyzed by the security module 118. In one embodiment, the analysis environment 314 includes a virtual machine 316 that provides a "sandbox" where the client 112 can be thoroughly analyzed without influencing the external state of the client 112. The virtual machine 316 is initialized to a known state each time control flow is passed to the analysis environment 314.

An embodiment of the virtual machine 316 is bytecode-driven and provides general Turing machine functionality allowing it to execute bytecode programs supporting essentially any type of analysis. Programs running within the virtual machine 316 can view, but not alter, state data saved by the redirection module 312. For example, the programs can see the parameters associated with the hooked call, but cannot alter the parameters. In addition, the virtual machine 316 is protected from improper memory accesses (such as attempts to read invalid memory pages), infinite loops, and other common program errors so that such errors will not result in faults or exceptions. Thus, any errors encountered by the virtual machine 316 while executing programs will not affect the application or other aspects of the client 112.

The virtual machine 316 can selectively execute signatures stored in a signatures module 318. In one embodiment, the signatures are programs designed to programmatically analyze the state of the client 112 in order to detect whether a hooked call is attempting to exploit a vulnerability of the hooked application 116. Different signatures allow detection of different types of exploits. In one embodiment, each signature is designed to detect an exploit of particular vulnerability of a particular application. For example, one signature is designed to detect a logic error such as whether HTML code is exploiting a vulnerability of a particular web browser by creating an object as a child object of a parent, where the parent is not allowed to have a child object. Another signature, in contrast, is designed to detect an exploit of a buffer overflow vulnerability of an email program by determining a script is attempting to copy a parameter into a too-small destination buffer.

In one embodiment, the signatures are based on computer programs written in a subset of the 'C' programming language. The programming language allows the signatures to read contents of processor 202 registers and other memory locations, read parameters of the hooked call, and read other state information, and perform logical operations to detect whether the hooked call is attempting to exploit a vulnerability of the application 116. The signatures are compiled into bytecode and can then be executed by the virtual machine 316. In one embodiment, the signatures are developed by security researchers and provided to the security module 118 in bytecode form. New signatures are developed as new exploits and vulnerabilities are found. The new signatures are provided to the security module 118 via the network 114 or via other avenues.

A whiteboard module 320 persistently stores information between virtual machine invocations. Sometimes, it is necessary or desirable for a signature or module to store information for use by other signatures or modules in detecting exploits. A signature can only access the state of the client 112 at the instant control flow was directed to the security module 118. Certain exploits may require multiple invocations of the virtual machine 316 and/or signatures to detect. The whiteboard module 320 provides a way for the signatures and other modules to store the signatures' own state, pass messages to other signatures, and perform other similar functions across different invocations of the virtual machine 316.

An analysis module 322 controls execution flow within the analysis environment 314 to perform the analysis and detect potential exploits of application vulnerabilities. In one embodiment, the analysis module 322 selects the signatures within the signature module 318 to execute in the virtual machine 316. For example, the analysis module 322 can determine that a particular version of an application 116 has been hooked and cause the virtual machine 316 to execute only the signatures for detecting exploits of vulnerabilities present in that version. In addition, the analysis module 322 can cause the virtual machine 316 to execute the signatures in particular orders.

An exploit blocking module 324 blocks attempts to exploit vulnerabilities in applications. In one embodiment, the blocking module 324 activates if a signature executed by the virtual machine 316 detects an exploit. The blocking module 324 blocks the exploit by, for example, skipping over the hooked function by causing the redirection module 312 to return control flow to the point in the application immediately following the call to the hooked function. Similarly, embodiments of the blocking module can terminate the application being exploited, perform an action (e.g., terminate, skip instructions, or ignore) selected by a user of the client 112 and/or perform other actions.

A reporting module 326 reports the results of the analyses performed by the security module 118. In one embodiment, the reporting module 326 provides a dialog box or other user interface element to a user of the client 112 if an exploit is detected and/or blocked. The reporting module 326 can perform additional actions, such as maintaining a log of analyses performed by the analysis environment 314, and providing copies of malicious code and other content to security analysts via the network 114.

Figure 4:
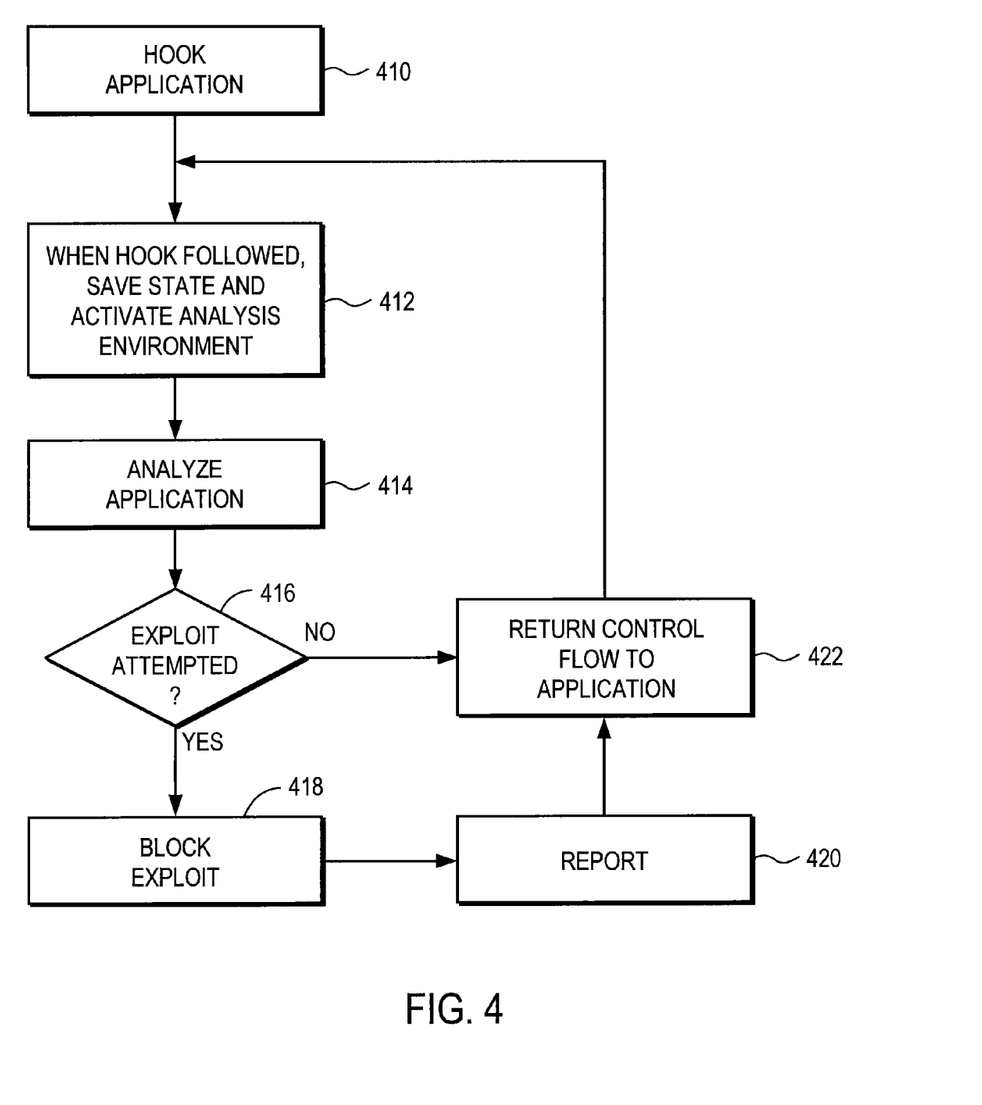
FIG. 4 is a flowchart illustrating steps performed by a security module to provide security to a client according to one embodiment.

FIG. 4 is a flowchart illustrating steps performed by a security module 118 to provide security to a client 112 according to one embodiment. Other embodiments perform the illustrated steps in different orders, and/or perform different or additional steps. Moreover, some or all of the steps can be performed by modules other than the security module 118.

The security module 118 hooks 410 an application 116 on the client 112. In one embodiment, the security module 118 hooks the application when the executable image is loaded into memory by the client 112. The hook transfers control flow to the security module 118 if execution reaches a hooked location in the application. When a hook is followed and control flow passes to the security module 118, the security module saves 412 the state of the client 112, including the contents of the processor 202 registers and the parameters of the hooked call, and activates an analysis environment 314.

In one embodiment, a virtual machine 316 within the analysis environment 314 executes signatures. The signatures programmatically analyze 414 the client state to determine whether a vulnerability in the application is being exploited. If 416 a signature detects an attempted exploit, the security module 118 blocks 418 the exploit by skipping over the instructions that constitute the exploit, terminating the application, or performing a different action. One embodiment of the security module 118 reports 420 the detected exploit to the user of the client 112 by, for example, presenting a dialog box and/or logging the event. Although not shown in FIG. 4, the security module 118 can also report 420 that no exploit was detected. Once the exploit is blocked and reported, the security module 118 returns 422 control flow back to the hooked application (provided that the application was not terminated in response to the exploit detection). Likewise, if the security module 118 returns 422 control flow back to the application 116 if it does not detect an exploit.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer adapted to detect an attempted exploit of a vulnerability of an application executed by the computer, the computer comprising:
   a computer processor; and
   a non-transitory computer-readable storage medium storing computer program modules configured to execute on the computer processor, the computer program modules comprising:
      a hooking module configured to insert a hook into the application in a location executed when a script attempts to interact with an application component other than a scripting component of the application;
      a redirection module configured to save a state of the computer responsive to execution of the hook in the application;
      an analysis module configured to execute one or more signatures that programmatically analyze the saved state of the computer to determine whether the script is exploiting the vulnerability of the application by attempting to overflow a buffer or create a logic error; and
      a reporting module configured to report whether the script is exploiting the vulnerability of the application.

2. The computer of claim 1, wherein the hooking module is further configured to hook an executable image of the application stored in a memory of the computer to transfer control flow to the redirection module responsive to execution of the hook.

3. The computer of claim 1, wherein the hooking module is configured to replace one or more first instructions in the application with one or more second instructions that transfer control flow to the redirection module.

4. The computer of claim 1, wherein the hooking module is configured to insert a plurality of hooks at a plurality of locations in the application that are likely to be executed during attempted exploits of multiple different vulnerabilities of the application.

5. The computer of claim 1, wherein the hooking module hooks an IDispatch::Invoke interface and/or an IDispatchEX:InvokeEx interface of the application.

6. The computer of claim 1, wherein the signatures are bytecode computer programs that can access but not alter the state of the computer.

7. The computer of claim 1, further comprising:
   a whiteboard module configured to store state information for the signatures.

8. The computer of claim 1, further comprising:
   a blocking module configured to block the attempted exploit of the vulnerability of the application.

9. A method for detecting an attempted exploit of a vulnerability of an application executed by the computer, comprising:
   inserting a hook into the application in a location executed when a script attempts to interact with an application component other than a scripting component of the application;
   saving a state of the computer responsive to execution of the hook in the application;
   executing one or more signatures that programmatically analyze the saved state of the computer to determine whether the script is exploiting the vulnerability of the application by attempting to overflow a buffer or create a logic error; and
   reporting whether the script is exploiting the vulnerability of the application.

10. The method of claim 9, wherein inserting a hook into the application replaces one or more first instructions in the application with one or more second instructions and further comprising:
   responsive to a determination that malicious code is not attempting to exploit the vulnerability of the application, restoring the saved state of the computer and executing the first instructions.

11. The method of claim 9, wherein the one or more signatures are bytecode computer programs that can access, but not alter, the state of the computer.

12. The method of claim 9, further comprising:
   blocking the attempted exploit of the vulnerability of the application.

13. A non-transitory computer-readable storage medium having computer program instructions embodied therein for detecting an attempted exploit of a vulnerability of an application executed by a computer, comprising:
   a hooking module configured to insert a hook into the application in a location executed when a script attempts to interact with an application component other than a scripting component of the application;
   a redirection module configured to save a state of the computer responsive to execution of the hook in the application;
   an analysis module configured to execute one or more signatures that programmatically analyze the saved state of the computer to determine whether the script is exploiting the vulnerability of the application by attempting to overflow a buffer or create a logic error; and
   a reporting module configured to report whether the script is exploiting the vulnerability of the application.

14. The non-transitory computer-readable storage medium of claim 13, wherein the signatures are bytecode computer programs.

15. The computer of claim 1, wherein the analysis module is further configured to:
   initialize a virtual machine within the computer using the saved state; and
   execute within the virtual machine the one or more signatures that programmatically analyze the state of the computer to determine whether malicious code is attempting to exploit the vulnerability of the application.

16. The computer of claim 1, wherein the virtual machine is a sandbox where the computer can be analyzed without affecting the state of the computer.

17. The method of claim 9, wherein executing one or more signatures comprises:
   initializing a virtual machine within the computer using the saved state; and
   executing within the virtual machine the one or more signatures that programmatically analyze the state of the computer to determine whether malicious code is attempting to exploit the vulnerability of the application.

18. The non-transitory computer-readable storage medium of claim 13, wherein the analysis module is further configured to:
   initialize a virtual machine within the computer using the saved state; and
   execute within the virtual machine the one or more signatures that programmatically analyze the state of the computer to determine whether malicious code is attempting to exploit the vulnerability of the application.

\* \* \* \* \*